(12) United States Patent
Ito

(10) Patent No.: US 8,909,684 B2
(45) Date of Patent: Dec. 9, 2014

(54) SEMICONDUCTOR DEVICE WITH A PLURALITY OF WRITE CONDITIONS AND MEMORY SYSTEM

(75) Inventor: Takafumi Ito, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 149 days.

(21) Appl. No.: 12/848,399

(22) Filed: Aug. 2, 2010

(65) Prior Publication Data

US 2011/0161386 A1 Jun. 30, 2011

(30) Foreign Application Priority Data

Dec. 25, 2009 (JP) ................. 2009-296341

(51) Int. Cl.
*G06F 17/30* (2006.01)
*G06F 12/02* (2006.01)
*G06F 3/06* (2006.01)

(52) U.S. Cl.
CPC .......... *G06F 12/0246* (2013.01); *G06F 3/0616* (2013.01); *G06F 3/0643* (2013.01); *G06F 3/0679* (2013.01); *G06F 2212/7201* (2013.01); *G06F 2212/7202* (2013.01)
USPC ........................................................ 707/824

(58) Field of Classification Search
USPC ........................................................ 707/824
See application file for complete search history.

(56) References Cited

U.S. PATENT DOCUMENTS

| 8,015,349 B2 * | 9/2011 | Maeda et al. ................. 711/103 |
| 2008/0172427 A1 | 7/2008 | Ito |
| 2009/0271586 A1 * | 10/2009 | Shaath .......................... 711/163 |

FOREIGN PATENT DOCUMENTS

| JP | 2006-40264 | 2/2006 |
| JP | 2008-171257 A | 7/2008 |

OTHER PUBLICATIONS

U.S. Appl. No. 13/235,436, filed Sep. 18, 2011, Suda, et al.
U.S. Appl. No. 13/050,450, filed Mar. 17, 2011, Ito.
Office Action issued Nov. 5, 2013 in Japanese Patent Application No. 2009-296341 (with English language translation).

* cited by examiner

*Primary Examiner* — Khanh Pham
(74) *Attorney, Agent, or Firm* — Oblon, Spivak, McClelland, Maier & Neustadt, L.L.P.

(57) ABSTRACT

According to one embodiment, a semiconductor device includes a semiconductor memory device and a memory controller. The semiconductor memory device is capable of holding data. The memory controller controls write operation to write data received from a host unit into the semiconductor memory device. The memory controller includes a logical address space including a plurality of address areas each having a write limiting condition according to an address and a type of data to be written into the semiconductor memory device, permitting an adding a file and inhibiting a written file from being overwritten in a specific file format.

31 Claims, 14 Drawing Sheets

| Byte position<br>Entry number | 0~10 bytes<br>Name<br>(DIR_Name) | 11bytes<br>Attribute<br>(DIR_Attr) | 12bytes<br>Reservation<br>(DIR_NTRes) | 13bytes<br>Creation time<br>(DIR_CrtTimeTenth) | 14~15bytes<br>Creation time<br>(DIR_CrtTime) | 16~17bytes<br>Creation date<br>(DIR_CrtDate) | 18~19bytes<br>Access date<br>(DIR_LstAccDate) | 20~21bytes<br>Cluster number<br>(DIR_FstClusHI) | 22~23bytes<br>Write time<br>(DIR_WrtTime) | 24~25bytes<br>Write date<br>(DIR_WrtDate) | 26~27bytes<br>Cluster number<br>(DIR_FstClusLO) | 28~31bytes<br>File size<br>(DIR_FileSize) |
|---|---|---|---|---|---|---|---|---|---|---|---|---|
| 0 | DCIM | Directory | "0x00" | 35 | 02:50 | 2009/12/01 | 2009/12/01 | Cluster 5 | 02:50 | 2009/12/01 | Cluster 5 | — |
| 1 | MISC | Directory | "0x00" | 10 | 02:50 | 2009/12/01 | 2009/12/01 | Cluster 9 | 02:50 | 2009/12/01 | Cluster 9 | — |
| 2 | FILE1.JPG | Read only | "0x00" | 15 | 12:00 | 2009/12/10 | 2009/12/10 | Cluster 20 | 12:50 | 2009/12/10 | Cluster 20 | 1.35MB |
| 3 | | | | | | | | | | | | |
| 4 | | | | | | | | | | | | |
| …… | …… | | | | …… | …… | …… | …… | …… | …… | …… | …… |

F I G. 5

| Access target \ Command | Read-only area | FAT | Limited-overwrite permitted directory entry | Arbitrary data overwrite permitted area | Address-incremental write area |
|---|---|---|---|---|---|
| Delete command | NG | NG | NG | NG | NG |
| Write command | NG | Writing is permitted in the following cases:<br><br>(1) Overwriting written data with the same data<br>(2) Creating a cluster chain for new directories or files | Writing is permitted in the following cases:<br><br>(1) Overwriting written data with the same data<br>(2) Creating an entry for new directories or files | OK | Only address-incremental writing is permitted |

FIG. 7

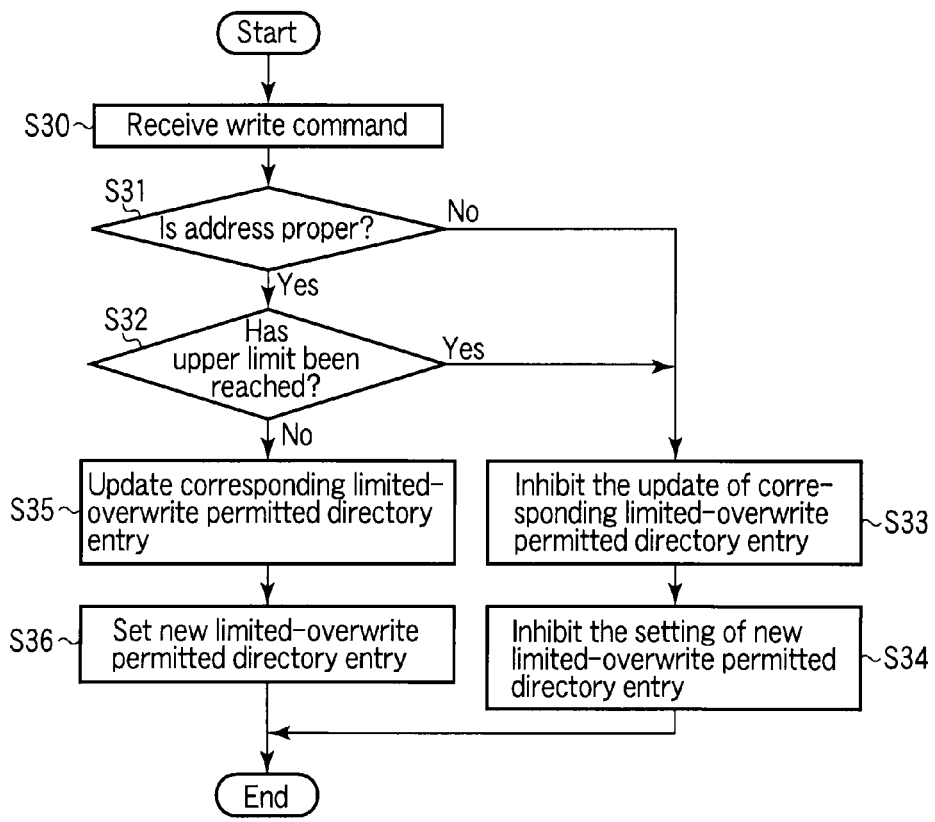

FIG. 8

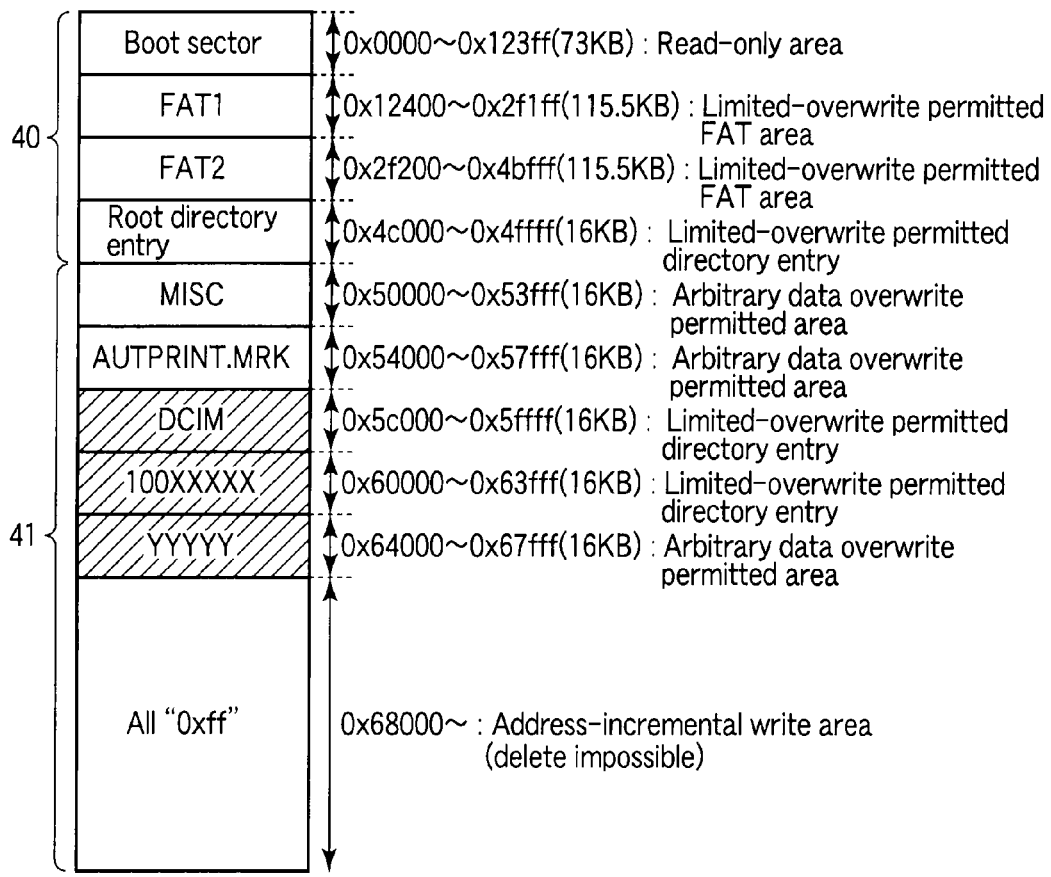
F I G. 11
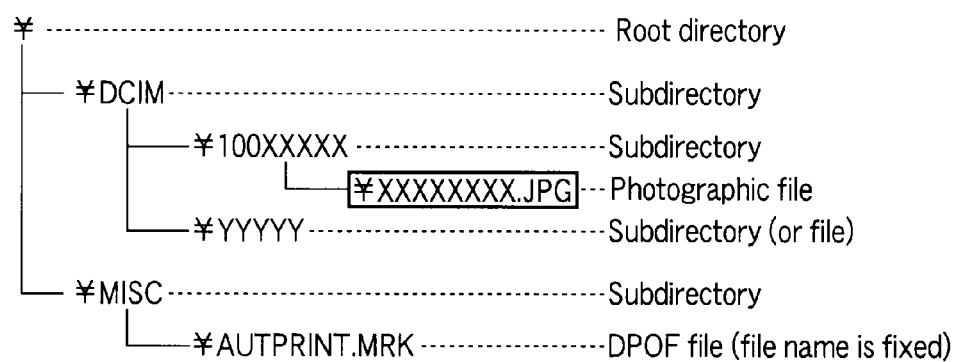
F I G. 12

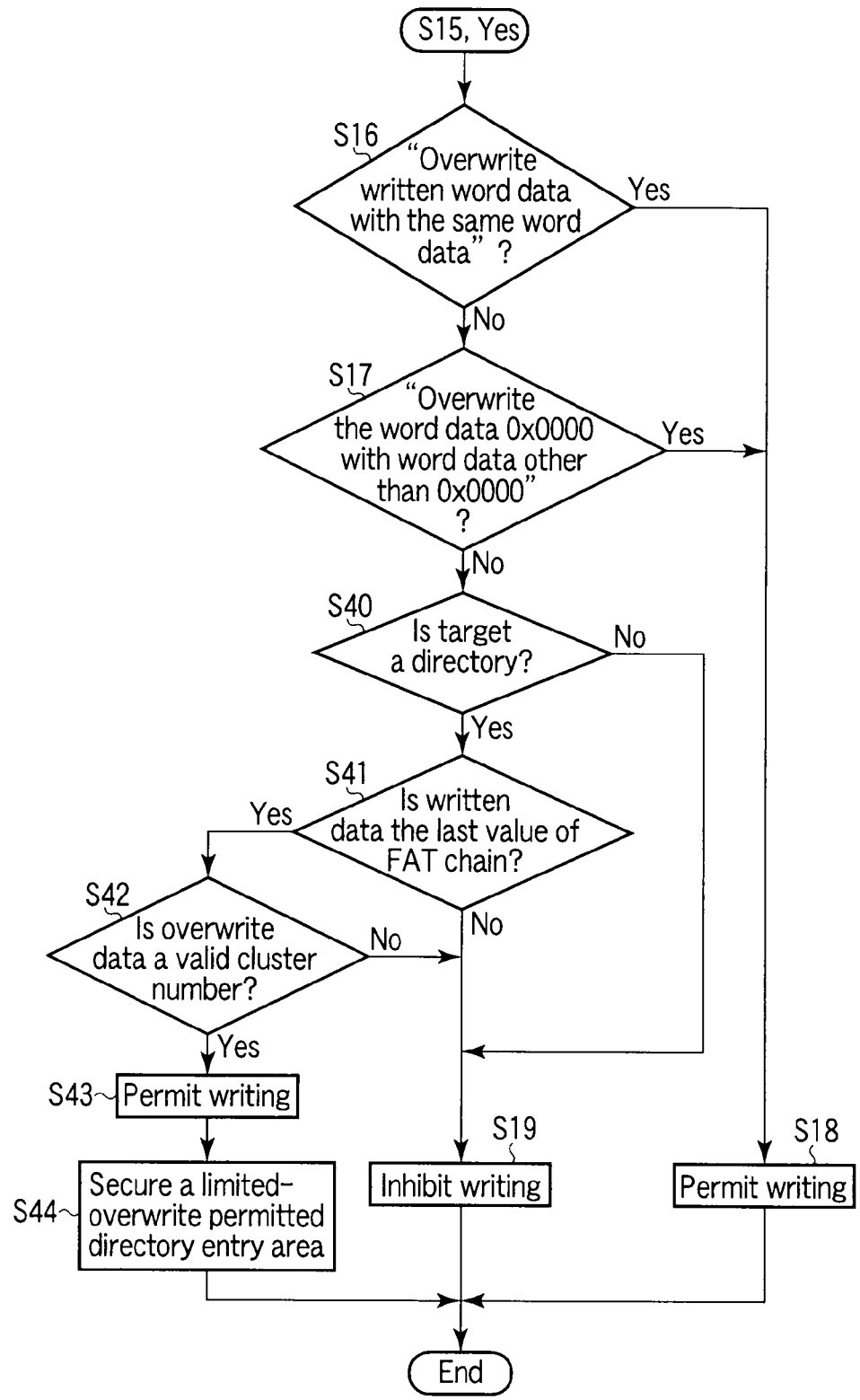
F I G. 14

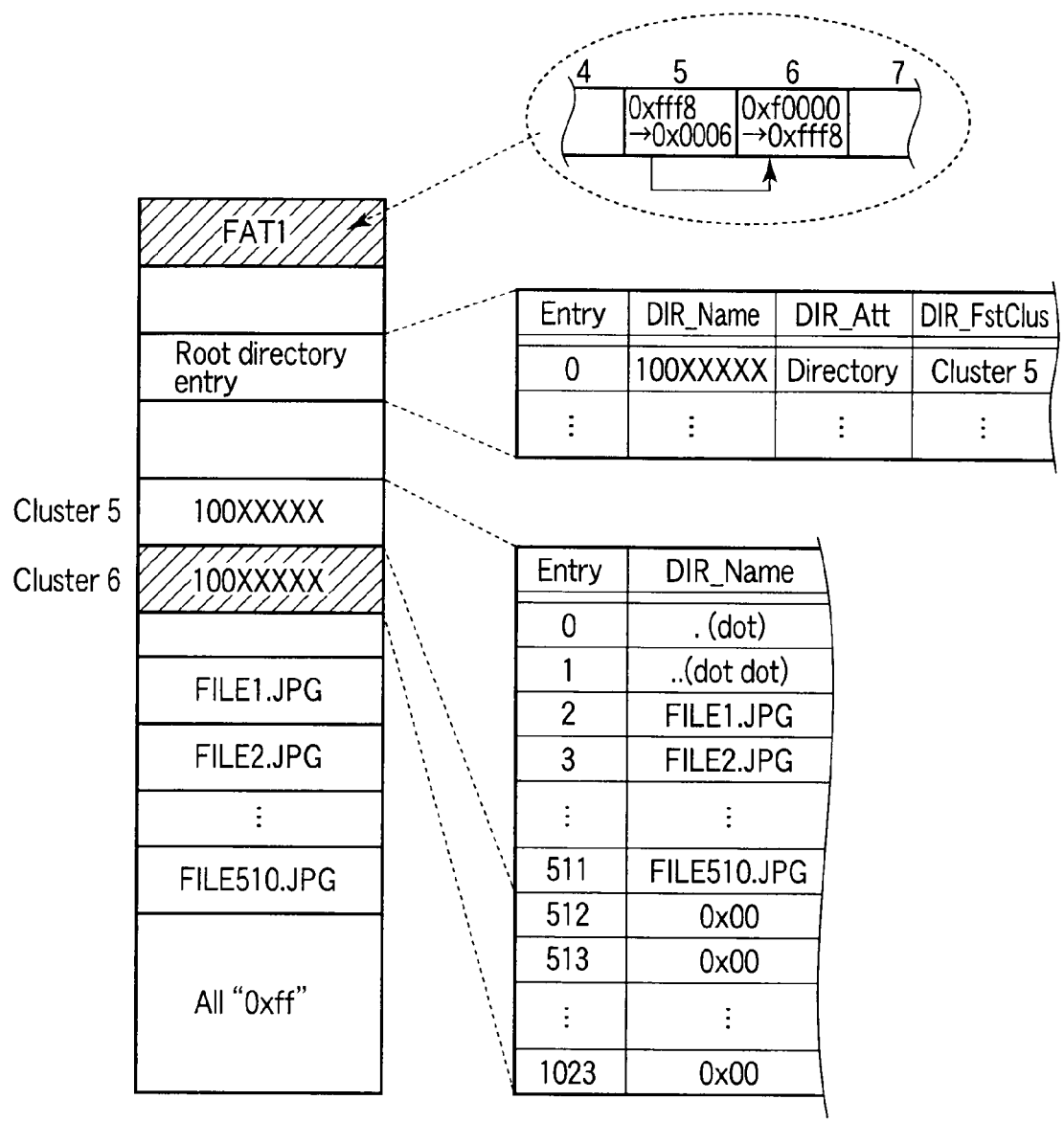
F I G. 16

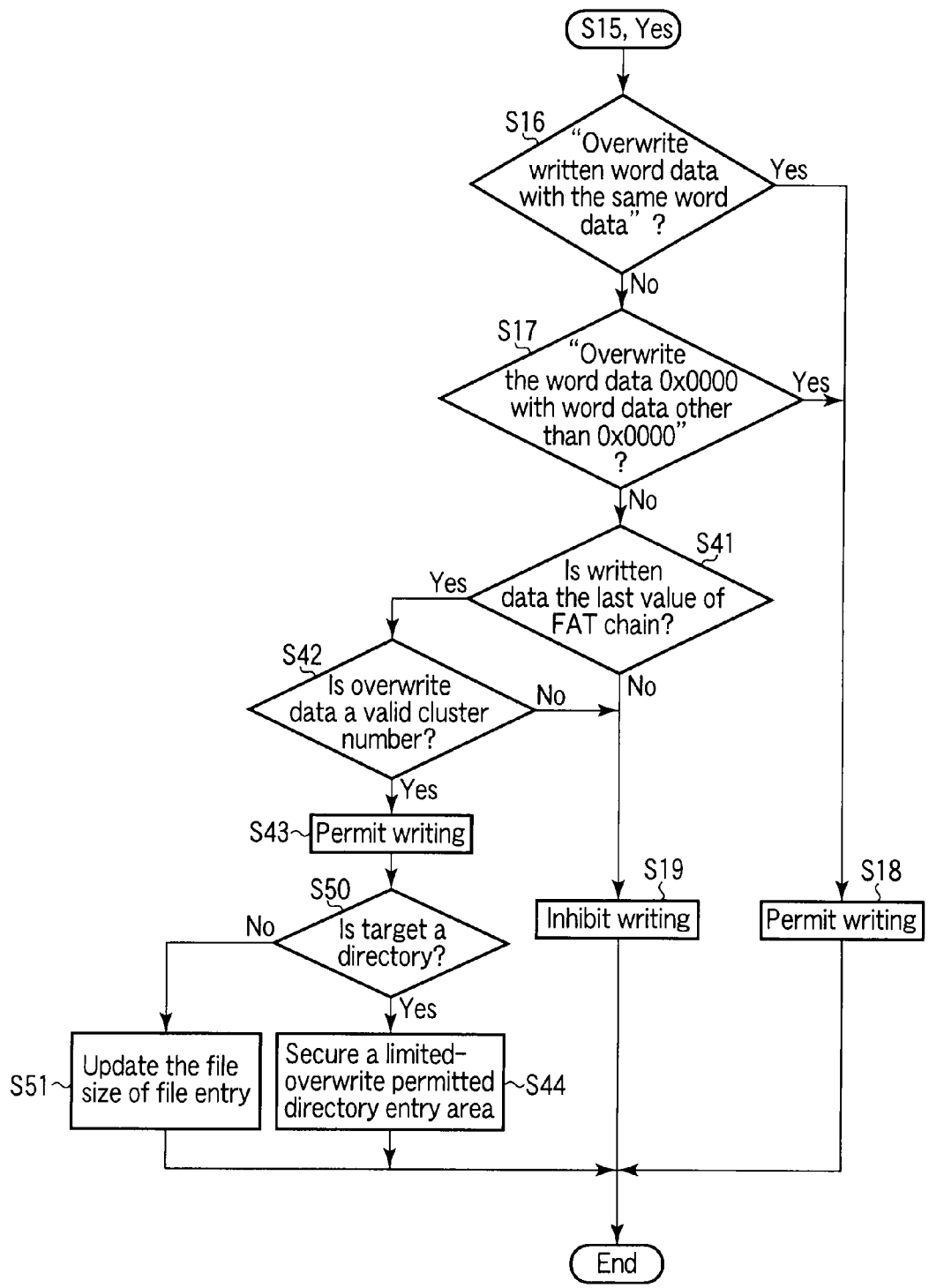
F I G. 17

SEMICONDUCTOR DEVICE WITH A PLURALITY OF WRITE CONDITIONS AND MEMORY SYSTEM

CROSS-REFERENCE TO RELATED APPLICATIONS

This application is based upon and claims the benefit of priority from Japanese Patent Application No. 2009-296341, filed Dec. 25, 2009; the entire contents of which are incorporated herein by reference.

FIELD

Embodiments described herein relate generally to a semiconductor device with a plurality of write conditions and a memory system. For example, they relate to a method of communication between a memory card and a host unit.

BACKGROUND

In recent years, SD™ memory cards have been widely used as data memory devices for photographs. It is hoped that SD memory cards can be used in applications where the maintainability of once-created files is important, such as photographs for official materials.

In such applications, SD memory cards need to be provided with the following characteristics:
  Photographic data once recorded on an SD card cannot be erased, changed, or falsified later.
  Photographic data taken by a conventional digital camera can be recorded.
  Photographic data can be read by an ordinary PC and USB reader/writer.

Various methods of handling data with an SD card have been proposed. One of them has been disclosed in, for example, Jpn. Pat. Appln. KOKAI Publication No. 2006-040264. However, there has been no SD memory card with all the above characteristics. Accordingly, it is difficult to use SD memory cards in applications where the maintainability of files is important.

BRIEF DESCRIPTION OF THE DRAWINGS

FIGS. 2 to 5 show a directory structure, a memory space, FAT, and directory entries according to the first embodiment, respectively;

FIG. 7 is a diagram to explain the operation of a memory card according to the first embodiment;

FIG. 8 is a flowchart to explain the operation of a memory card according to the first embodiment;

FIGS. 10 and 11 are conceptual diagrams of a directory structure and a memory space according to the first embodiment, respectively;

FIGS. 12 and 13 are conceptual diagrams of a directory structure and a memory space according to the first embodiment, respectively;

FIG. 14 is a flowchart to explain the operation of a memory card according to a second embodiment;

FIGS. 15 and 16 are conceptual diagrams of a memory space according to the second embodiment;

FIG. 17 is a flowchart to explain the operation of a memory card according to a third embodiment;

DETAILED DESCRIPTION

In general, according to one embodiment, a semiconductor device includes a semiconductor memory device and a memory controller. The semiconductor memory device is capable of holding data. The memory controller controls write operation to write data received from a host unit into the semiconductor memory device. The memory controller includes a logical address space including a plurality of address areas each having a write limiting condition according to an address and a type of data to be written into the semiconductor memory device, permitting an adding a file and inhibiting a written file from being overwritten in a specific file format.

[First Embodiment]

A semiconductor device and a memory system according to a first embodiment will be explained, taking an SD memory card (hereinafter, simply referred to as a memory card) and a memory system including the SD memory card as an example.

<Configuration of Memory Card>

Figure 1:
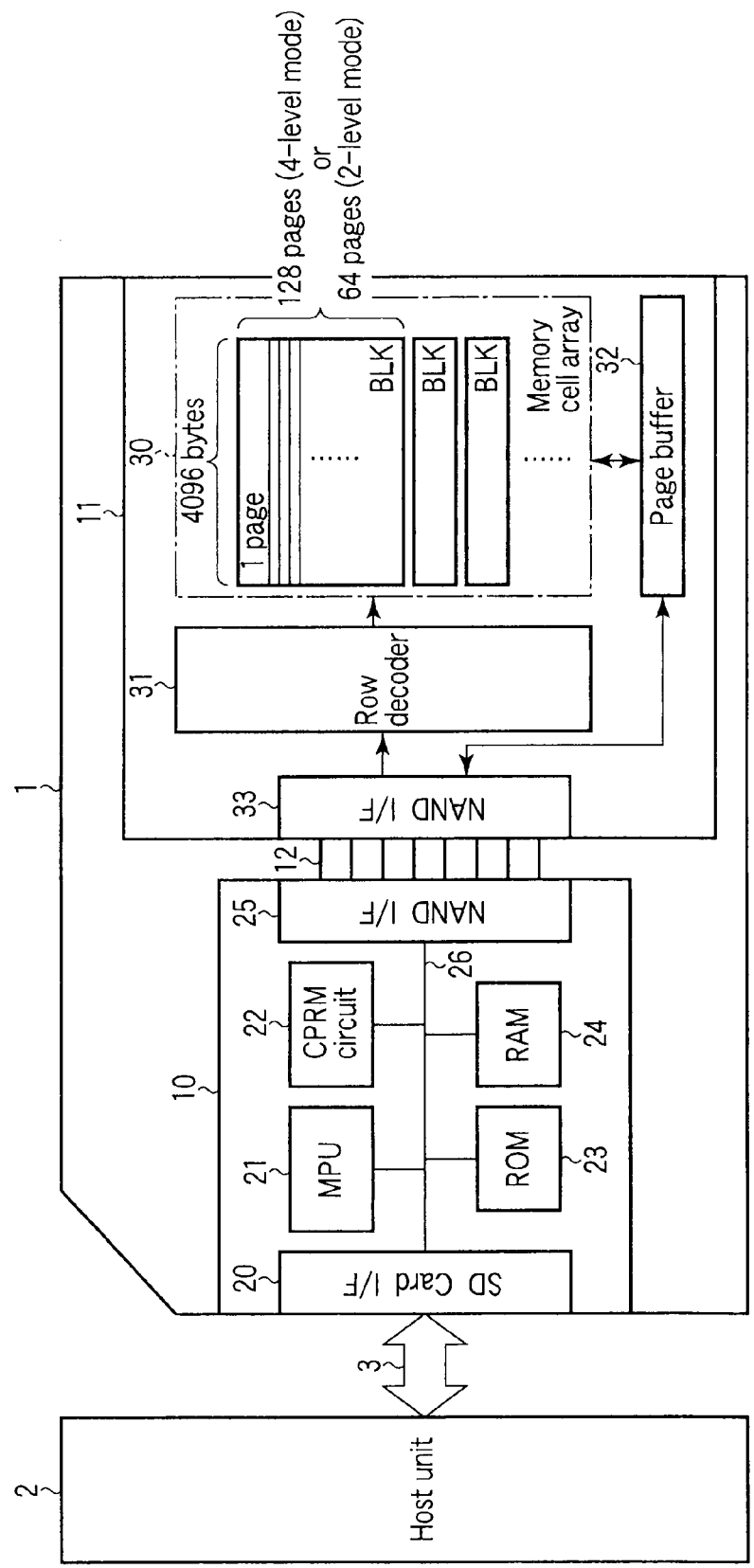
FIG. 1 is a block diagram of a memory system according to a first embodiment.

First, an overall configuration of a memory card will be explained with reference to FIG. 1. FIG. 1 is a block diagram of a memory system with a memory card according to the first embodiment.

As shown in FIG. 1, the memory system includes a memory card 1 and a host unit 2 (e.g., a personal computer or a digital camera). The memory card 1 is capable of communicating with the host unit 2 via a bus interface 3. The memory card 1, when being connected to the host unit 2, receives a power supply and operates, thereby carrying out a process in response to access from the host unit 2.

The memory card 1 roughly includes a memory controller 10, a NAND flash memory 11, and a data bus 12. The memory controller 10 and NAND flash memory 11 may be formed on separate substrates or on the same substrate. The memory controller 10 and NAND flash memory 11 are connected to each other with the data bus 12 in such a manner that they can communicate with each other.

<Configuration of Memory Controller 10>

Next, the configuration of the memory controller 10 will be explained in detail with reference to FIG. 1. As shown in FIG. 1, the memory controller 10 includes an SD card interface 20, an MPU 21, a CPRM (Copy Protection for Prerecorded Media) circuit 22, a ROM 23, a RAM 24, and a NAND interface 25. These are formed on the same semiconductor substrate and connected to one another via an internal bus 26 in such a manner that they can communicate with one another.

The SD card interface 20, which can be connected to the host unit 2 with the bus interface 3 (SD card bus), supervises connection with the host unit 2. The NAND interface 25, which is connected to the NAND flash memory 11 with the data bus 12, supervises communication with the NAND flash memory 11.

The MPU 21 controls the overall operation of the memory card 1. For example, when the memory card 1 receives a power supply, the MPU 21 reads firmware (control program) stored in the ROM 23 onto the RAM 24 and executes a specific process, thereby creating various tables on the RAM

24. In addition, the MPU 21 receives a write command, a read command, or an erase command from the host unit 2 and performs a specific process on the NAND flash memory 11 or controls a data transfer process.

The ROM 23 stores a control program and the like executed by the MPU 21. The RAM 24, which is used as a work area of the MPU 21, stores a control program and various tables.

The CPRM circuit 22 supervises a copyright protection function in the memory card 1. That is, the CPRM circuit 22 determines whether to permit access when the host unit 2 accesses secret information in the NAND flash memory 11.

<Configuration of NAND Flash Memory 11>

Next, the configuration of the NAND flash memory 11 will be explained with reference to FIG. 1. As shown in FIG. 1, the NAND flash memory 11 includes a memory cell array 30, a row decoder 31, a page buffer 32, and a NAND interface 33.

The memory cell array 30 includes a plurality of memory blocks BLK. Each of the memory blocks BLK is a set of memory cells each capable of holding data. The memory cells are arranged in a matrix. For example, (4096×8) memory cells in the same row are connected to the same word line. As an example, each of the blocks BLK includes 64 word lines in the configuration of FIG. 1. Data is written or read en bloc into or from a plurality of memory cells connected to the same word line. This unit is called a page. In the example of FIG. 1, one page contains 4096 bytes. Each of the memory cells can hold 1-bit (or 2-level mode) data or 2-bit (or 4-level mode) data. Data is written or read in bits even in a 4-level mode. Accordingly, each of the blocks BLK includes 64 pages in the 2-level mode, 128 pages in the 4-level mode, twice the number of pages in the 2-level mode. Data is erased in memory blocks BLK.

The NAND interface 33 supervises communication with the NAND interface 25 of the memory controller 10 via the data bus 12. The NAND interface 33 transfers a row address supplied from the memory controller 10 to the row decoder 31 and write data to the page buffer 32. In addition, the NAND interface 33 transmits read data transferred from the page buffer 32 to the memory controller 10.

The row decoder 31 decodes the row address supplied from the NAND interface 33. On the basis of the decoding result, the row decoder 31 selects a row direction in any one of the memory blocks BLK in the memory cell array 30. That is, the row decoder 31 selects any one of the pages.

The page buffer 31 transmits/receives data to/from the memory cell array 30 and holds data temporarily. Data is exchanged between the page buffer 32 and the memory cell array 30 in pages. In a write operation, the page buffer 32 temporarily holds write data supplied from the NAND interface 33 and writes the write data into the memory cells. In reading data, the page buffer 32 holds read data temporarily and transfers the read data to the NAND interface 33.

<Memory Space of Memory Card 1>

Figure 2:
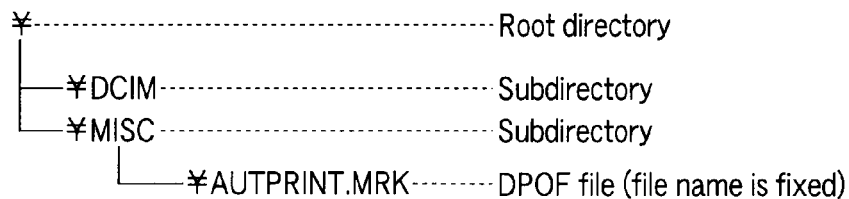

Next, a memory space of the NAND flash memory 11 in the memory card 1 configured as described above will be explained, taking as an example a case where a directory structure as shown in FIG. 2 has been formed. That is, suppose a case where two subdirectories, "DCIM" and "MISC", have been formed in the root directory and a file named "AUTPRINT.MRK" has been formed in subdirectory "MISC."

Figure 3:
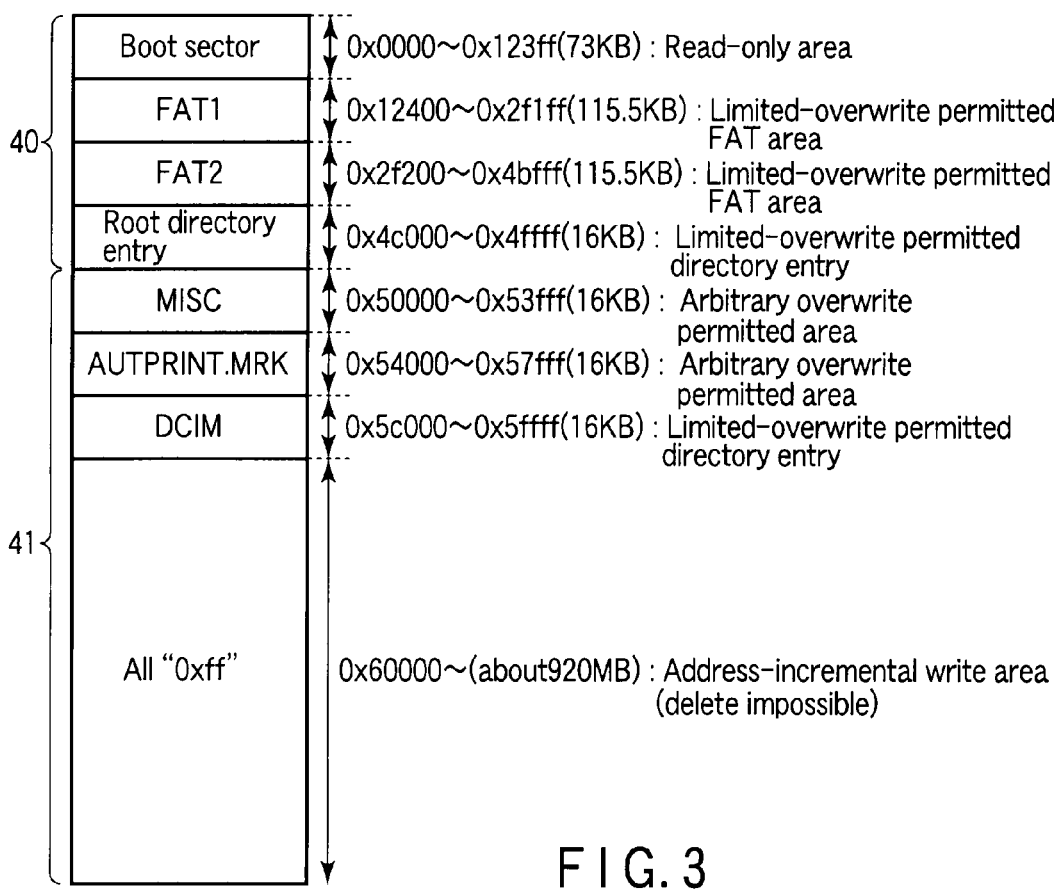

FIG. 3 is a memory map showing a memory space of the NAND flash memory 11 which has the directory structure as shown in FIG. 2. The memory space is roughly includes a management area 40 and a user data area 41.

The management area 40, which is provided to manage files (data) recorded in the NAND flash memory 11, holds file management information. A method of managing files (data) recorded in the memory is called a file system. In the file system, the following have been determined: a method of creating directory information of files and folders, a method of moving files and folders, a method of deleting files and folders, a method of recording data, locations and uses of management areas, and other items. FIG. 3 shows a file allocation table (FAT) file system as an example. Hereinafter, "0x" added to the head of a number means that the number following "0x" is in a hexadecimal representation.

The management area 40 includes, for example, a boot sector, FAT1, FAT2, and root directory entry. The boot sector is stored in an area ranging from, for example, logical addresses "0x00000" to "0x123ff" and holds boot information. The boot sector is a read-only area. FAT1 and FAT2 are stored in an area ranging from logical addresses "0x12400" to "0x2f1ff" and an area ranging from "0x2f200" to "0x4bfff," respectively, and memorize in which cluster the data has been stored. FAT1 and FAT2 are permitted to be overwritten under limited conditions. Such an area is called a limited-overwrite permitted FAT area. The root directory entry, which is stored in an area ranging from, for example, logical addresses "0x4c000" to "0x4ffff," holds information on the root directory. More specifically, the root directory entry memorizes not only a file name or folder name, a file size, attributes, and file-updated date but also which cluster is the start cluster of a file in FAT1 and FAT2. The root directly is also permitted to be overwritten under limited conditions. Such a directory entry is called a limited-overwrite permitted directory entry area.

The user data area 41 is an area excluding the management area 40, particularly an area which stores net data written by the user. In the user data area 41, a subdirectory entry for "MISC" is created in an area ranging from logical addresses "0x50000" to "0x53fff" and "AUTPRINT.MRK" is written in an area ranging from logical addresses "0540000" to "0x57fff". These two areas can be overwritten arbitrarily. Such an area is called an arbitrary overwrite permitted area. In an area ranging from logical addresses "0x5c000" to "0x5ffff," a subdirectory entry for "DCIM" has been formed. This entry is a limited-overwrite permitted directory entry. The other area, that is, an area ranging from logical address "0x60000" and forward, is an unused area. In the unused area, "0xff" has been written. The unused area is inhibited from being overwritten or deleted. Only address-incremental write is permitted in the unused area. Such an area is called an address-incremental write area. Address-incremental write is a method of writing data sequentially, beginning with an address next to the last address of an area in which data has already been written.

<FAT>

Next, FAT1 and FAT2 will be explained. Hereinafter, FAT1 and FAT2 will be simply referred to as FAT.

The memory space is a set of spaces of a specific size called clusters. When data to be written is larger than the cluster size, the data is divided into clusters and stored. In this case, clusters in which data is written may be inconsecutive. That is, data is written into clusters separate from one another. In this case, management data about which clusters the data has been divided and written into is stored in FAT.

Figure 4:
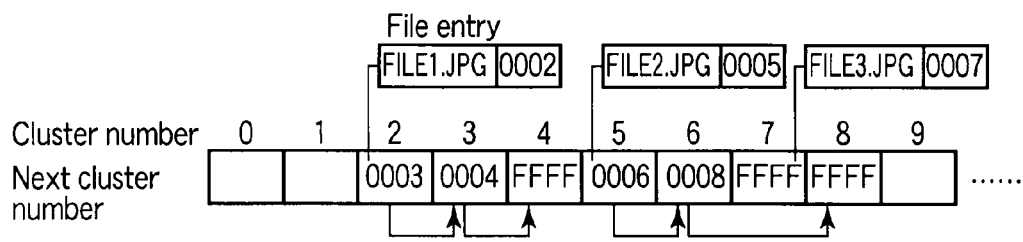

FIG. 4 shows an example of FAT and file entries in the root directory entry. For example, suppose the root directory includes three files, "FILE1.JPG," "FILE2.JPG," and "FILE3.JPG" and their respective first clusters are "0002," "0005," and "0007."

In FAT, the number of the cluster to be connected to each of the clusters has been written. For example, in the case of "FILE1.JPG," it is seen that a cluster that stores data item following data item in the first cluster "0002" is cluster "0003" and a cluster that stores data item following data item in cluster "0003" is cluster "0004." File "FILE1.JPG" is restored by concatenating data items in clusters "0002," "0003," and "0004". In the cluster that stores the last part of the file data, any one of "0xfff8" to "0xffff" has been written. In the unused clusters, "0x0000" has been written.

<Root Directory Entry>

Next, the root directory entry will be explained. FIG. 5 is a conceptual diagram showing a configuration of the root directory entry. As an example, FIG. 5 shows a case where not only directories "DCIM" and "MISC" but also file "FILE1.JPG" is created in the root directory.

As shown in FIG. 5, the root directory entry includes a plurality of entries, each containing 32 bytes. Each of the entries holds information on the files or directories included in the root directory. Each entry holds the name of a file or a subdirectory (DIR_Name, 11 bytes), an attribute (DIR_Attr, 1 byte), reservation (DIR_NTRes, 1 byte), creation time (DIR_CrtTimeTenth, 1 byte), creation time (DIR_CrtTime, 2 bytes), creation date (DIR_CrtDate, 2 bytes), last access date (DIR_LstAccDate, 2 bytes), upper 2 bytes in cluster number of the first cluster (DIR_FstClusHI), write time (DIR_Wrt-Time, 2 bytes), write date (DIR_WrtDate, 2 bytes), lower 2 bytes in cluster number of the first cluster (DIR_FstCusLO), and file size (DIR_FileSize, 4 bytes). An attribute is information as to whether the file is a read-only file or not, a directory or not, a system file or not, a hidden file or not, and the like. All the 1-byte data indicating reservation are represented as "0x00." Creation time (DIR_CrtTimeTenth) indicates a millisecond part of the creation time of the corresponding file or directory. Creation time (DIR_CrtTime) represents the time in hours: minutes. The first cluster number is divided into two, DIR_FstCusHI and DIR_FstClusLO, and recorded in the root directory entry.

For example, in the example of FIG. 5, it is seen that file "FILE1.JPG" is in the root directory, the file is a read-only file, it was created on Dec. 10, 2009, 12:00:15, the file size is 1.35 MB, and the data was written starting with cluster 20. In FIG. 5, entries 0 to 2 are used and entry 3 and forward are unused. All of the unused entries have either "0x00" or "0xff."

The structure of a subdirectory entry is basically the same as that of the root directory entry. What differs from the root directory entry is that a subdirectory entry includes dot (.) entry representing itself and dot dot (..) entry representing a parent directory.

<Operation of Memory Card 1 in Response to a Write or a Delete Command>

Figure 6:
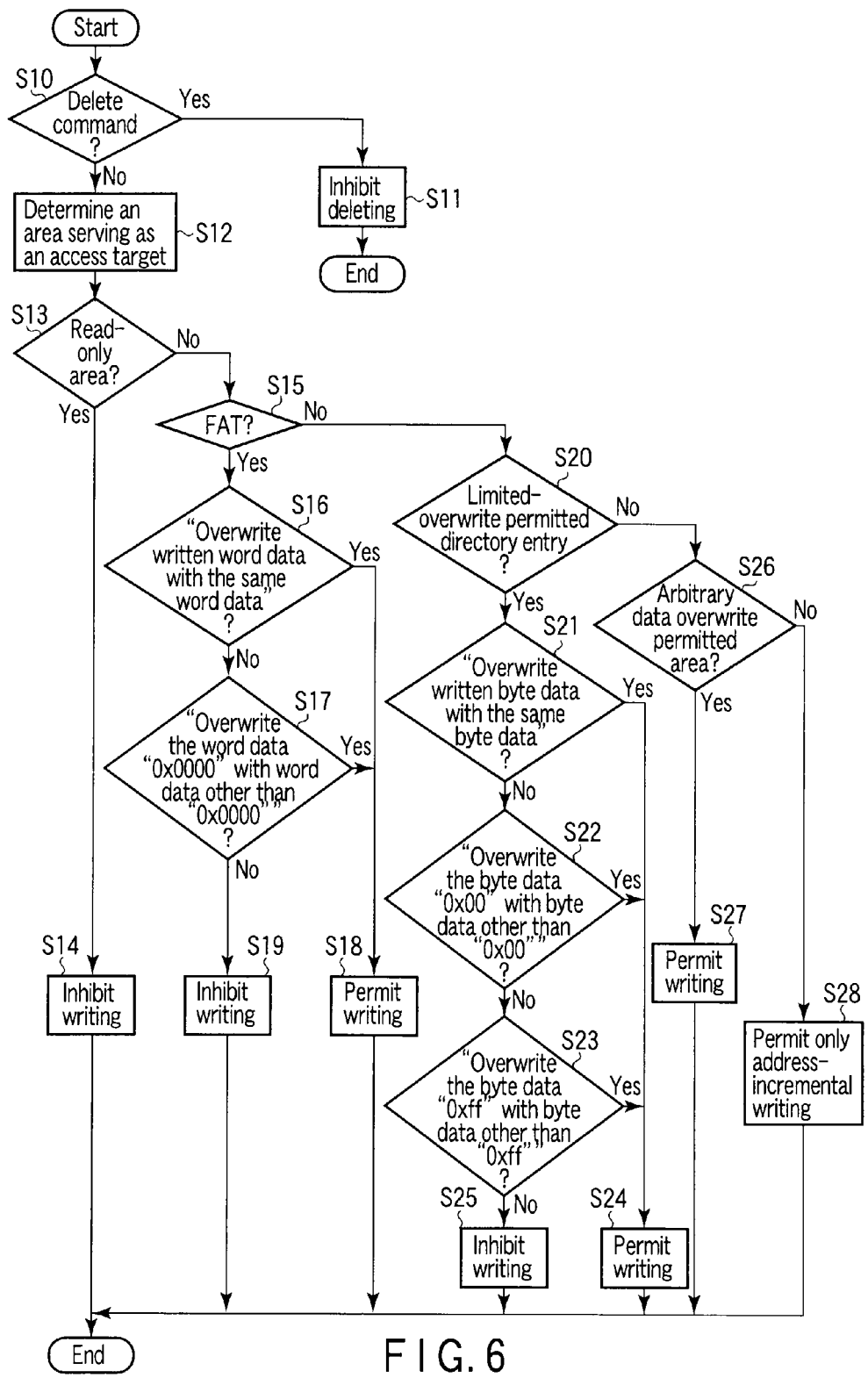
FIG. 6 is a flowchart to explain the operation of a memory card according to the first embodiment.

Next, the operation of the memory card 1 when a write command or a delete command is issued from the host unit 2 to the memory card 1 will be explained with reference to FIG. 6. FIG. 6 is a flowchart to explain the operation of the memory card 1 which has received a write or a delete command. The operation mentioned below is carried out by the SD card interface 20 or MPU 21 of the memory card 1. With the SD card, data is written in units of a 512-byte data block (sector) in response to a write command. There are two types of write commands: one is a single block write command to write one data block and the other is a multi block write command to write a plurality of data blocks in consecutive logical addresses.

As shown in FIG. 6, if the received command is a delete command (YES in step S10), the memory card 1 inhibits deleting (step S11). That is, the memory card 1 of the first embodiment does not support a delete command. The memory card 1 returns General Error to the host unit 2 without deleting any data.

If the received command is not an erase command (NO in step S10), that is, if it is a write command, the memory card 1 determines an area serving as an access target (or a write target) (step S12). The memory card 1 can make this determination from the address received together with the write command.

If the access target is a read-only area (in FIG. 3, a boot sector) (YES in step S13), the memory card 1 inhibits writing (step S14). Then, the memory card 1 returns a write protect error to the host unit 2 without writing any data.

If the access target is a limited-overwrite permitted FAT area (NO in step S13, YES in step S15), writing is permitted only when the accessed contents are "overwrite written word data with the same word data" (YES in step S16) or "overwrite the word data "0x0000" with word data other than "0x0000"" (YES in step S17) (step S18). In any case other than that (NO in step S16, NO in step S17), writing is inhibited (step S19). Then, the memory card 1 returns a write protect error to the host unit 2 without writing any data. That is, if all of 512 bytes of data included in one-sector data of a write command to the limited-overwrite permitted FAT area result in YES in step S16 or in step S17, writing is performed properly (this includes a case where a part of the sector data results in YES in step S16 and all of the remaining data result in YES in step S17). In contrast, if at least a part of one-sector data of a write command to the limited-overwrite permitted FAT area include data items that result in NO in both steps S16 and S17, writing is not performed.

If the access target is a limited-overwrite permitted directory entry area (NO in step S15, YES in step S20), writing is permitted (step S24) only when the accessed contents are "overwrite written byte data with the same byte data" (YES in step S21), "overwrite the byte data "0x00" with byte data other than "0x00"" (YES in step S22), or "overwrite the byte data "0xff" with byte data other than "0xff"" (YES in step S23). In any case other than that (NO in step S21, NO in step S22, NO in step S23), writing is inhibited (step S25). Then, the memory card 1 returns a write protect error to the host unit 2 without writing any data. That is, if all 512 bytes of data included in one-sector data of a write command to the limited-overwrite permitted directory entry area result in YES in step S21, in step S22, or in step S23, writing is performed properly (this includes a case where a part of the sector data result in YES in any one of steps S21 to S23 and all of the remaining data result in YES in another one of steps S21 to S23). In contrast, if at least a part of one-sector data of a write command to the limited-overwrite permitted directory entry area includes data items that result in NO in steps S21 to S23, writing is not performed.

If the access target is an arbitrary data overwrite permitted area (NO in step S20, YES in step S26), writing is permitted (step S27).

If the access target is an area other than the areas described above (NO in step S26), that is, an address-incremental write area, only address-incremental writing is permitted (step S28). "Address-incremental writing" is a method of writing data into only sector addresses behind the logical sector addresses of data previously written. In contrast, "overwriting" is a method of writing data into arbitrary sector addresses, regardless of the logical sector addresses of data previously written.

The memory controller 10 controls the NAND flash memory 11 as described above. The flowchart of FIG. 6 is summarized as shown in the table of FIG. 7. As shown in FIG.

7, a delete command is not executed in any area. In contrast, a write command is dealt with differently depending on the area to be accessed.

First, writing is not performed on a read-only area.

In a limited-overwrite permitted FAT area, only the following are permitted: one is to overwrite written data with the same data and the other is to create a cluster chain for creating new directories and new files. Changing a once-created cluster chain is inhibited. A once-created cluster chain may be changed as an exceptional measure. This will be explained later as a second and a third embodiment.

In a limited-overwrite permitted directory entry area, only the following are permitted: one is to overwrite written data with the same data and the other is to create entries concerning new directories and new files. Changing a once-recorded entry is inhibited. However, whether to permit items in an entry to be changed may be determined on an item basis. This will be explained as a fourth embodiment later.

In an arbitrary data overwrite permitted area, writing is permitted. This area is, for example, a directory entry area where data needs to be overwritten or an area for storing a file itself, such as a DPOF file when photographic data taken by a digital camera is stored in the memory card 1. Data can be overwritten with an arbitrary value.

An address-incremental write area is an area in which photographic main data is to be written. In the address-incremental write area, only address-incremental writing is permitted.

<Operation of Creating a New Subdirectory>

Next, the operation of the memory card 1 in creating a new subdirectory will be explained with reference to FIG. 8. FIG. 8 is a flowchart to explain the operation of the memory card 1. The operation below is mostly carried out by the MPU 21.

As shown in FIG. 8, the memory card 1 receives a subdirectory create instruction from the host unit 2 through a write command (step S30). First, the memory card 1 determines whether the write address is proper (step S31). That is, if the start address of the subdirectory is at or before the last-written address of the address-incremental write area or if the start address is included in an already-set limited-overwrite permitted directory entry area, the memory card 1 determines that the write address is not proper (NO in step S31). In this case, the memory card 1 inhibits the entry from being updated in the corresponding limited-overwrite permitted directory entry (root directory entry or any one of the corresponding subdirectory entries) (step S33). In addition, the memory card 1 does not create a new limited-overwrite permitted directory entry area (step S34). Then, the memory card 1 returns a write protect error to the host unit 2.

If the start address is proper (YES in step S31), the memory card 1 then determines whether the number of already-set limited-overwrite permitted directory entry areas has reached the upper limit of the settable number (step S32). If the number has reached the upper limit (YES in step S32), the memory card 1 passes control to steps S33 and S34 because it cannot create a limited-overwrite permitted directory entry area any more.

If the number has not reached the upper limit (NO in step S32), the memory card 1 updates the corresponding directory entry (step S35). Then, the memory card 1 detects that the start cluster number field (DIR_FstClusLO) of the entries (excluding dot entry and dot dot entry) in the corresponding limited-overwrite permitted directory entry area has been updated to a value other than "0x0000" and that the file attribute field (DIR_Attr) of the entry has been updated to "0x10" (directory attribute). With this detection, the memory card 1 automatically sets one cluster (16 KB) from the start cluster as a new limited-overwrite permitted directory entry area (step S36).

Figure 9:
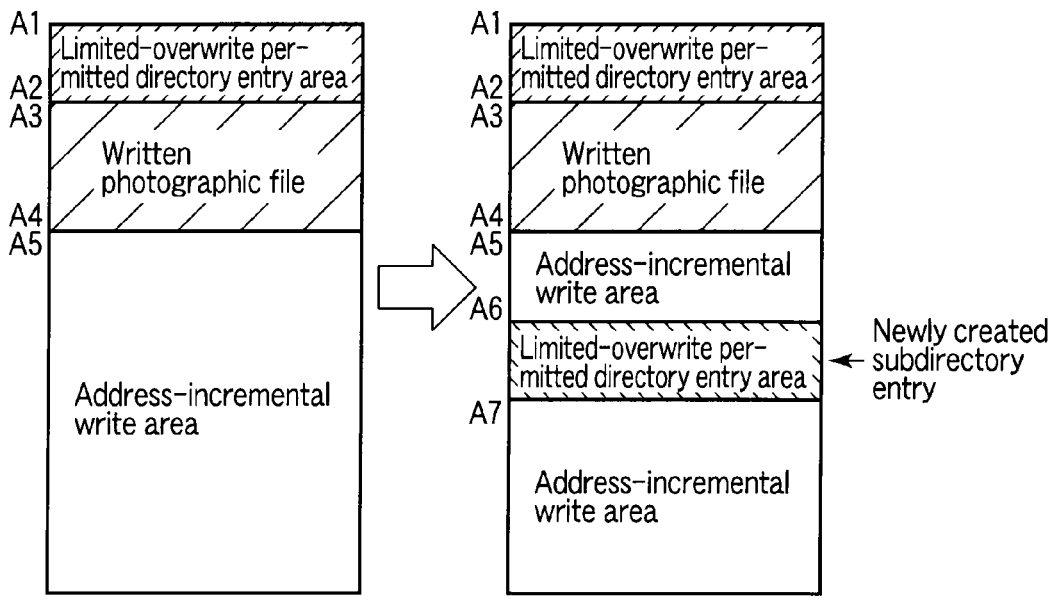
FIG. 9 is a conceptual diagram of a memory space according to the first embodiment.

What has been described above is shown in FIG. 9. FIG. 9 is a memory map showing a memory space when a new subdirectory is created. As shown in FIG. 9, suppose a limited-overwrite permitted directory entry area is set in, for example, an area ranging from addresses A1 to A2, a photographic file is written in an area ranging from address A3 to A4, and an area ranging from address A5 and forward is an address-incremental write area.

In this state, when the memory card 1 has received a new subdirectory create instruction, if its start address is in the range of addresses A1 to A4, the address is not proper (NO in step S3). Accordingly, in this case, a subdirectory is not created. If the start address is in an area ranging from address A5 and forward, the address is proper (YES in step S31). Therefore, for example, in an area ranging from addresses A6 to A7, a subdirectory entry is created. In this case, the area between addresses A5 and A6 and the area ranging from address A7 and forward remain as address-incremental write areas.

<Operation of Memory Card 1 When an Image is Taken With a Digital Camera>

Next, the operation of the memory card 1 configured as described above when the card 1 is used as a storage device of a digital camera will be explained below.

<Preformat>

The memory card 1 is preformatted with a special host unit for use in a digital camera, thereby forming a data structure shown in FIGS. 2 and 3. The memory card 1 is shipped in the preformatted state.

To preformat the memory card 1, the special host unit carries out the following processes:

(1) First, the host unit creates FAT1 and FAT2 on the basis of specific data corresponding to the capacity of the card.

(2) Next, the host unit creates subdirectories "DCIM" and "MISC" in the root directory and then creates a file "AUTPRINT.MRK" in subdirectory "MISC." "AUTPRINT.MRK" is a DPOF (digital print order format) file for photoprint. Its file name is fixed.

(3) Next, according to the format, the host unit sets a read-only area, a limited-overwrite permitted FAT area, a limited-overwrite permitted directory entry area (root directory, DCIM), and an address-incremental write area.

As a result, the data structure shown in FIGS. 2 and 3 is formed. At this time, in the boot sector, a specific format parameter value has been written. In FAT1 and FAT2, the cluster chain of each directory has been written (in the unused clusters, "0x0000" has been written).

In the root directory entry cluster, a 32-byte directory entry for "MISC" and a 32-byte directory entry for "DCIM" are written in that order. All the data following them have been initialized to "0x00" or "0xff."

In a cluster for subdirectory "MISC," a 32-byte directory entry (dot entry) for a current directory, a 32-byte directory entry (dot dot entry) for a parent directory, and a 32-byte file entry for "AUTPRINT.MRK" have been written in that order. All the data following them have been initialized to "0x00" or "0xff." The "AUTPRINT.MRK" file is size 0.

All the clusters for file "AUTPRINT.MRK" are initialized to "0x00."

In a cluster for subdirectory "DCIM," a 32-byte directory entry (dot entry) for a current directory and a 32-byte directory entry (dot dot entry) for a parent directory have been written in that order. All the data following them have been initialized to "0x00" or "0xff."

The areas following them are in the initial state. All the data is made "0xff."

In some types of digital cameras, "MISC" and "AUTPRINT.MRK" are not created until DPOF setting has been done. In this case, the data structure of the memory card 1 is such that "MISC" and "AUTPRINT.MRK" are eliminated in FIGS. 2 and 3. After the shipment of the memory card 1, "MISC" and "AUTPRINT.MRK" are created by the processing of the digital camera.

<Operation When the Memory Card 1 is Inserted in a Digital Camera>

Next, the operation when the preformatted memory card 1 is inserted in a digital camera (host unit 2) will be explained.

When having detected that the memory card 1 has been inserted in the digital camera, the camera creates subdirectories "100XXXXX" and "YYYYY" under subdirectory "DCIM." "XXXXX" is 5-byte ASCII character strings for each camera maker. Under the subdirectory "100XXXXX", photographic files (JPEG files) are stored sequentially. "YYYYY" is an additional function file or subdirectory for each maker. "YYYYY" may not be set, depending on the model.

Figure 10:
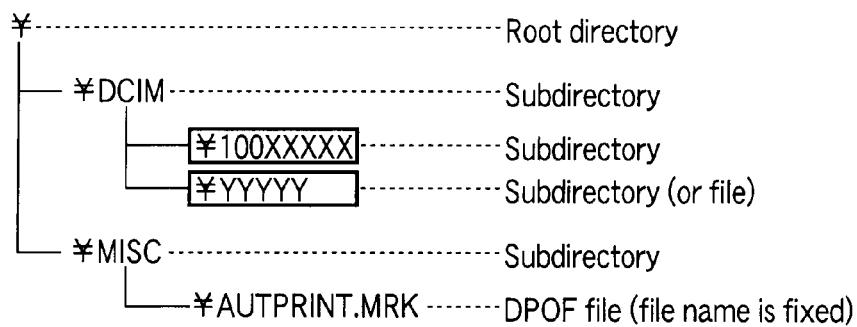

The directory structure and logical address map of the memory card 1 obtained as a result of the above operation are shown in FIGS. 10 and 11. What have been changed from FIGS. 2 and 3 are indicated by boxes in FIG. 10 and shaded areas in FIG. 11.

When a new subdirectory entry "100XXXXX" has been created in "DCIM" by the digital camera, a 32-byte subdirectory entry "100XXXXX" is created in a third position following a directory entry for a parent directory under a directory entry for a current directory in the cluster for "DCIM."

When the subdirectory entry has been written, the memory card 1 automatically sets the subdirectory entry area as a new limited-overwrite permitted directory entry area.

In a cluster for subdirectory "100XXXXX" (all the initial values are "0xff"), a 32-byte directory entry for a current directory and a 32-byte directory entry for a parent directory are created. The data after this are all "0xff."

Normally, one cluster is secured for subdirectory "100XXXXX." Since the number of file entries that can be created in one-cluster subdirectory is limited, if the number of photographs taken increases, a file entry of a JPEG file cannot fit in one cluster. In this case, the following two measures can be taken, depending on the model of digital camera:

(A) The FAT chain of subdirectory "100XXXXX" is extended to secure a new cluster and the size of subdirectory "100XXXXX" is increased, thereby increasing the number of photographic files that can be stored under "100XXXXX."

(B) A new subdirectory "101XXXXX" is created under "DCIM" and photographic files are stored under the new subdirectory. After this, subdirectories "102XXXXX," "103XXXXX," . . . are created sequentially.

The method of the first embodiment can deal with the method described in item (B). The way of dealing with the method in item (A) will be explained in a second embodiment.

<Photography Operation of Digital Camera>

Next, a sequence in which photographic data is written into the memory card 1 when a picture is taken with a digital camera will be explained. The write sequence is executed as follows.

(1) First, the digital camera writes new file entries with the following values into subdirectory "100XXXXX":
DIR_Name: XXXXXXXX.JPG
DIR_Attr: 0x20 (=ARCHIVE)
DIR_NTRes: 0x00 (fixed value)
DIR_CrtTimeTenth, DIR_CrtTime, DIR_CrtDate: File creation time value
DIR_LstAccDate: 0x00
DIR_FstClusHI, DIR_FstClusLO: 0x0000, 0x0000 (initial value)
DIR_WrtTime, DIR_WrtDate: File creation time value
DIR_FileSize: 0x0000_0000 (initial value)

(2) Next, the digital camera writes a cluster chain value for the photographic file into the unused tables in FAT1 and FAT2 (unused table is filled by a value of "0x0000").

(3) Next, the digital camera overwrites the file entry created in item (1) with the start cluster number.

(4) Next, the digital camera writes (address-incremental-writes) the photographic file data main part, starting with the start cluster set in item (3).

(5) Finally, the digital camera overwrites the file entry created in item (1) with the file size.

Figure 13:
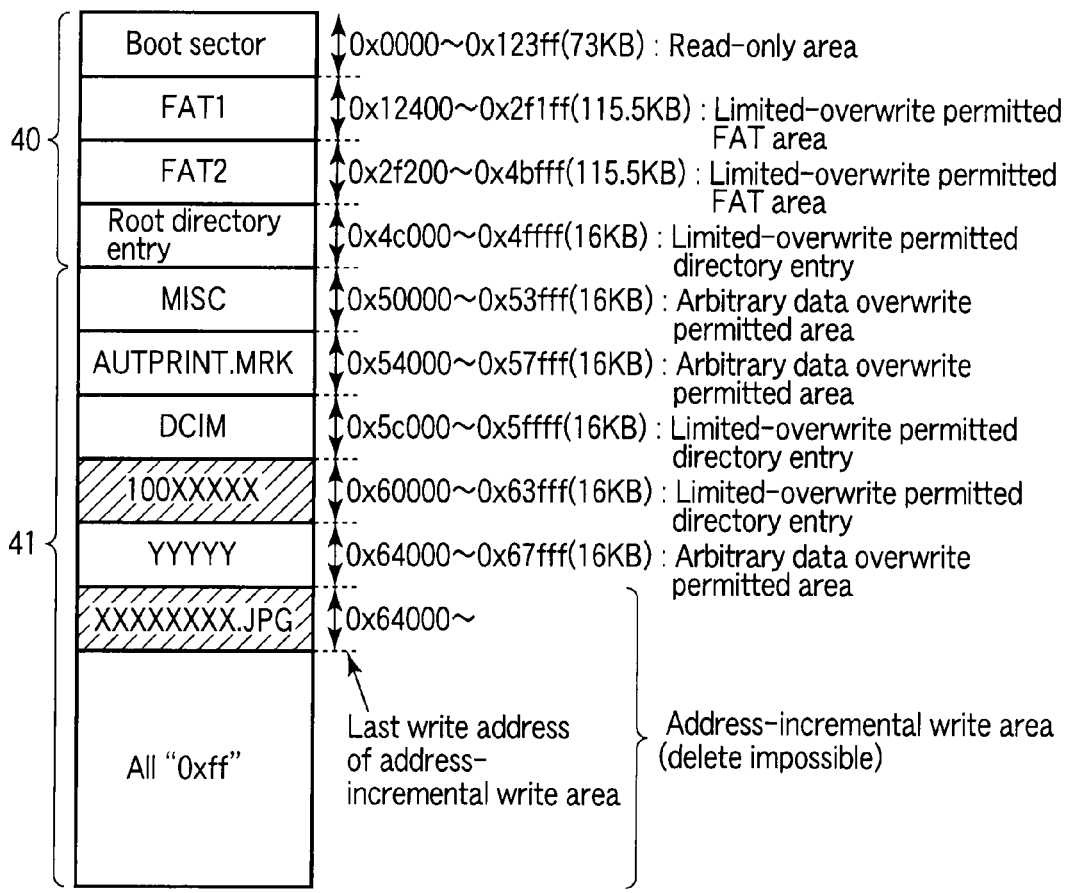

The directory structure and logical address map of the memory card 1 obtained as a result of the above operations are shown in FIGS. 12 and 13. What have been changed from FIGS. 10 and 11 are indicated by boxes in FIG. 12 and shaded areas in FIG. 13.

As shown in FIGS. 12 and 13, photographic file "XXXXXXXX.JPG" is recorded in the address-incremental write area and an entry for the photographic file is created in subdirectory "100XXXXX."

After this, each time a picture is taken, the operations in items (1) to (5) are repeated.

<Access to Memory Card 1 From Host Unit 2>

Next, access to the memory card 1 in which a photographic file has been recorded as shown in FIG. 11 from various host units 2 will be explained below.

<File Delete, Overwrite, and Reformat Operations By Various Host Units>

In the process of deleting the photographic file recorded in the memory card 1, the first byte of the corresponding file entry is overwritten with "0x00." Accordingly, since this meets the overwrite limiting condition for a limited-overwrite permitted directory entry area (NO in step S21, NO in step S22, and NO in step S23 in FIG. 6), a write protect error occurs and file deletion is not executed.

If the memory card 1 is subjected to logical formatting again, this involves writing into the boot sector, overwriting to reinitialize the FAT, and overwriting to initialize the file entry. Accordingly, since the reformatting meets the write limiting condition for the respective areas (YES in step S13, NO in steps 16 and 17, and NO in steps S21 to S23 in FIG. 6), a write protection error occurs and file deletion is not executed.

If each field in the file entry of the photographic file or the cluster chain of FAT is overwritten with data, this meets the overwrite limiting conditions for a limited-overwrite permitted directory entry area and a limited-overwrite permitted FAT area (NO in steps S16, S17, NO in steps S21 to S23 in FIG. 6). Accordingly, a write protection error occurs and neither the file entry nor FAT is overwritten.

Furthermore, if the photographic file main part is overwritten with data, this meets the limiting condition for an address-incremental write area (step S28). Accordingly, a write protection error occurs and the data is not altered.

<Reading of a File With an Ordinary PC and a Card Reader/Writer>

Data is read as with a conventional SD card. Accordingly, a file can be read properly with an ordinary PC and a card reader/write or the like.

<File Access From Host Unit>

The host unit 2 can write a new file by use of conventional FAT file system software. As described above, however, file deletion, overwrite, and reformat operations result in a write protect error. The same holds true when a file is read.

<Effect>

As described above, with the configuration of the first embodiment, the memory card 1 with the following characteristics is obtained:

A photographic file once written in the memory card 1 cannot be deleted, changed, or falsified later.

Photographs taken by an ordinary digital camera can be recorded.

Photographs can be read with an ordinary PC and USB reader/writer.

The memory card 1 cannot be formatted.

Accordingly, a memory card excellent in the maintainability of file data can be realized. In addition, a memory card suitable for recording photographs for official materials can be obtained.

To set a logical address range as a read-only area, a limited-overwrite permitted FAT area, a limited-overwrite permitted directory entry area, an arbitrary data overwrite permitted area, or an address-incremental write area, a special command newly defined is used. This enables an SD host unit to set various areas. The set values are stored in the system area of the NAND flash memory 11.

Another method is to write specific key data (e.g., "0x55," "0xaa," "0x55," "0xaa," "0x55," "0xaa," "0x55," "0xaa") in a specific logical memory addresses (e.g. logical addresses "0x000000" to "0x00000f") in the user data area and further write data representing area attribute data and address range in a logical address area behind the specific logical memory addresses, thereby informing the memory controller 10 of the address area range, instead of using a special command. That is, in the NAND flash memory 11, information that a logical address area ranging from "0x00000" to "0x123ff" is a read-only area, that a logical address area ranging from "0x12400" to "0x4bfff" is a limited-overwrite permitted FAT area, and the like are written in an area behind the key data in the example of FIG. 3. The data is written not as normal write data but as system data into the NAND flash memory 11. In this case, since a special command is not needed, the advantage is that the software on the PC side can notify addresses using a conventional USB reader/writer or the like that does not support a new command.

[Second Embodiment]

Next, a semiconductor device and a memory system according to a second embodiment will be explained. The second embodiment relates to a method of, when a file cannot fit in one subdirectory, securing a new cluster and extending the FAT chain of the subdirectory as explained in the first embodiment. To use the method, the limitation on writing FAT explained in the first embodiment is changed in a semiconductor device according to the second embodiment. Since the rest is the same as in the first embodiment, explanation of it will be omitted.

<Operation of Memory Card 1 in Response to Write Command>

The operation of the memory card 1 when the host unit 2 has issued a data write command to FAT of the memory card 1 will be explained with reference to FIG. 14. FIG. 14 is a flowchart to explain the operation of the memory card 1 that has received a write command to FAT. The flowchart corresponds to the processes when the result of step S15 is YES and afterward in the first embodiment. The remaining operations are the same as in the first embodiment.

As shown in FIG. 14, if NO in step S16 and NO in step S17, the memory card 1 determines whether a cluster to be overwritten corresponds to a directory (step S40). This determination can be made by checking DIR_Attr of the corresponding directory entry. If the cluster is not a directory (NO in step S40), writing is inhibited (step S19).

If the cluster is a directory (YES in step S40), the memory card 1 determines whether the value already written in the cluster to be overwritten is a value ("0xfff8" to "0xffff") representing the end of the FAT chain (step S41). If the value is not a value representing the end of FAT chain (NO in step S41), writing is inhibited (step S19).

If the value represents the end of FAT chain (YES in step S41), the memory card 1 determines whether overwrite data for the cluster is a valid cluster number (step S42). An invalid cluster number is, for example, "0x0000 (unused cluster)" or "0x0001 (reserved cluster number)". If the value is not a valid cluster number (NO in step S42), writing is inhibited (step S19).

If the value is a valid cluster number (YES in step S42), the memory card 1 permits writing (step S43). As a result, the cluster number is rewritten. Then, the memory card 1 regards a cluster corresponding to the rewritten cluster number as an extended cluster area of the subdirectory and automatically sets the extended cluster area as a limited-overwrite permitted directory entry area (step S44).

<Concrete Example>

Figure 15:
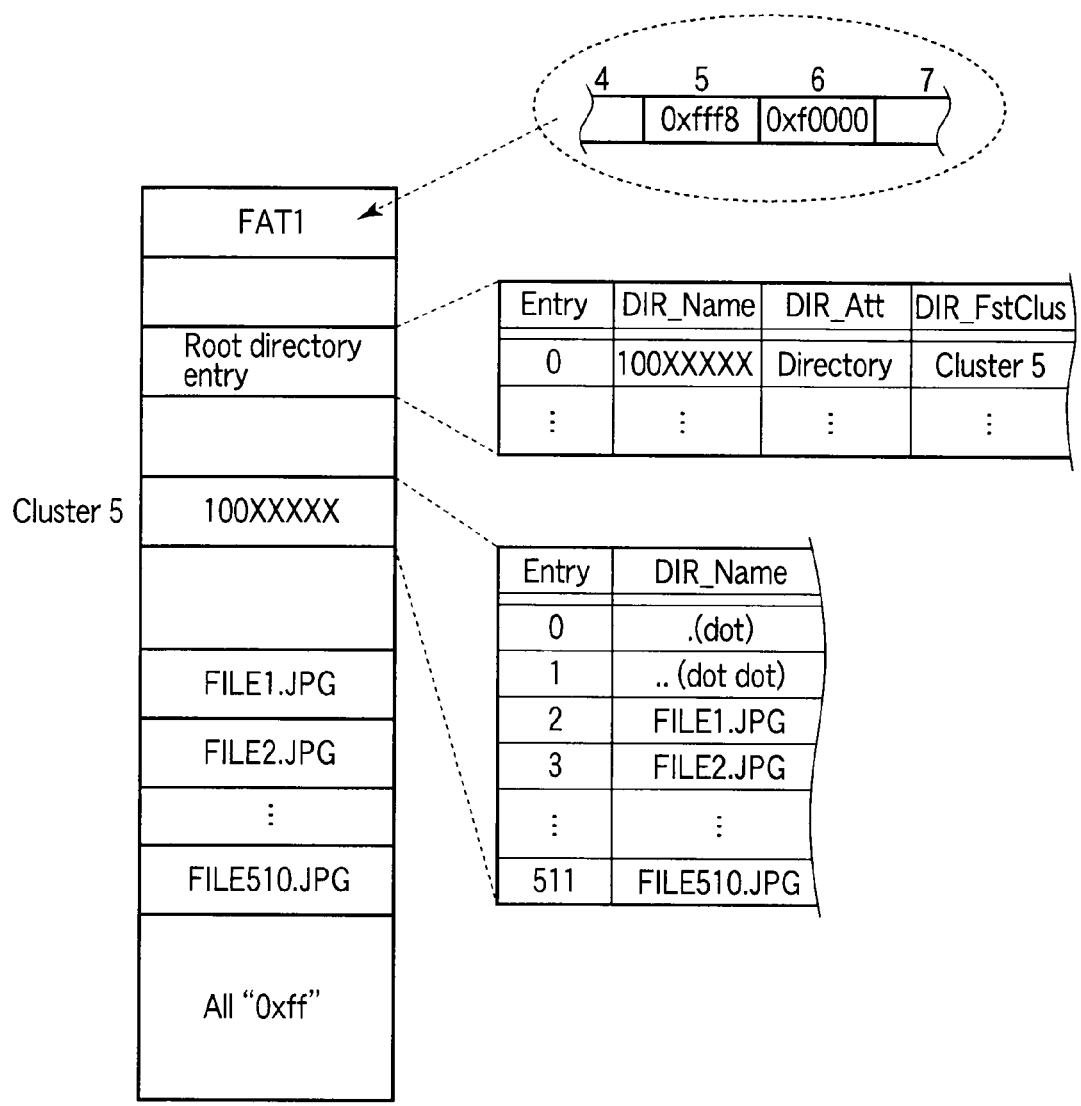

Next, a concrete example of the above operation will be explained. Assume a state is as shown in FIG. 15. FIG. 15 is a memory map of the memory card 1, showing only a part related to this example.

As shown in FIG. 15, subdirectory "100XXXXX" has been created in the root directory and its start cluster is cluster 5. The number of entries in subdirectory "100XXXXX" is, for example, 512. In subdirectory "100XXXXX", 510 JPEG files have been created. Accordingly, 512 entries in subdirectory "100XXXXX" are all used, including dot entries and dot dot entries. In this state, a case where new JPEG file "FILE511.JPG" is recorded in the memory card 1 is considered.

With the method of the first embodiment, since the FAT is inhibited from being overwritten, subdirectory "101XXXXX" is newly created and file "FILE511.JPG is stored under the directory.

In contrast, with the method of the second embodiment, a cluster is newly secured as a directory entry for subdirectory "100XXXXX" to extend the cluster chain, thereby storing file "FILE511.JPG under subdirectory "100XXXXX." This is shown in FIG. 16. FIG. 16 is a memory map of the memory card 1. What have been changed from FIG. 15 is indicated by shaded areas in FIG. 16.

As shown in FIG. 16, the memory card 1 secures an additional unused cluster 6 as a directory entry for subdirectory "100XXXXX." Since the value of cluster 5 in FAT is "0xfff8" (YES in step 41 in FIG. 14) and the overwrite data is a valid cluster number ("0x0006") indicating cluster 6 (YES in step S42 in FIG. 14), overwriting is permitted (step 43 in FIG. 14). That is, the value corresponding to cluster number 5 is changed from "0xfff8" to "0x0006." Then, cluster 6 is made an extended cluster area for subdirectory "100XXXXX" and set as a limited-overwrite permitted directory entry area (step S44 in FIG. 14). As a result, the number of entries in subdirectory "100XXXXX" is 512+512=1024, enabling "FILE511.JPG" to be stored under subdirectory "100XXXXX." The value corresponding to cluster 6 in FAT is replaced with "0xfff8" indicating the end of the FAT chain (YES in step S17 in FIG. 6).

<Effect>

With the configuration of the second embodiment, write limitation on FAT is relaxed partially to permit the extension of the FAT chain. Accordingly, not only can the effect explained in the first embodiment be obtained, but also the user-friendliness of the memory card 1 can be improved.

[Third Embodiment]

Next, a semiconductor device and a memory system according to a third embodiment will be explained. The third embodiment relates to a configuration for dealing with recording video files in the first and second embodiments. Hereinafter, only what differs from the first and second embodiments will be explained.

<Operation of Memory Card 1 in Response to Write Command>

To record video files, the write limitation on FAT explained in the first embodiment is changed in the configuration of the third embodiment. FIG. 17 is a flowchart to explain the operation of the memory card 1 that has received a write command to FAT. The flowchart corresponds to the processes when the result of step S15 is YES and afterward in the first embodiment. The remaining operations are the same as in the first embodiment.

As shown in FIG. 17, if NO in step S16 and NO in step S17, the memory card 1 determines whether the value already written in a cluster to be overwritten is a value ("0xfff8" to "0xffff") indicating the end of the FAT chain (step S41). If the value is not a value indicating the end of the FAT chain (NO in step S41), writing is inhibited (step S19). If the value indicates the end of the FAT chain (YES in step S41), the memory card 1 determines whether overwrite data for the cluster is a valid cluster number (step S42). If the overwrite data is not a valid cluster number (NO in step S42), writing is inhibited (step S19). The operations in steps S41 to S43 are the same as those in the second embodiment.

If the overwrite data is a valid cluster number (YES in step S42), the memory card 1 determines whether the cluster to be overwritten corresponds to a directory (step S50). The determination can be made by checking DIR_Attr of the corresponding directory entry as in step S40 explained in the second embodiment.

If the cluster is not a directory (NO in step S50), that is, if the cluster is a file, the memory card 1 permits to change the value of the file size field in the corresponding file entry in the limited-overwrite permitted directory entry area (step S51). The memory card 1 permits to change the value only to a value larger than the already written value and prevents the value from being changed to a value smaller than the already written value.

If the cluster is a directory (YES in step S50), this corresponds to the second embodiment and control proceeds to step S44. With the method of the first embodiment, if the cluster is a directory, writing is inhibited (step S19).

<Concrete Example>

Figure 18:
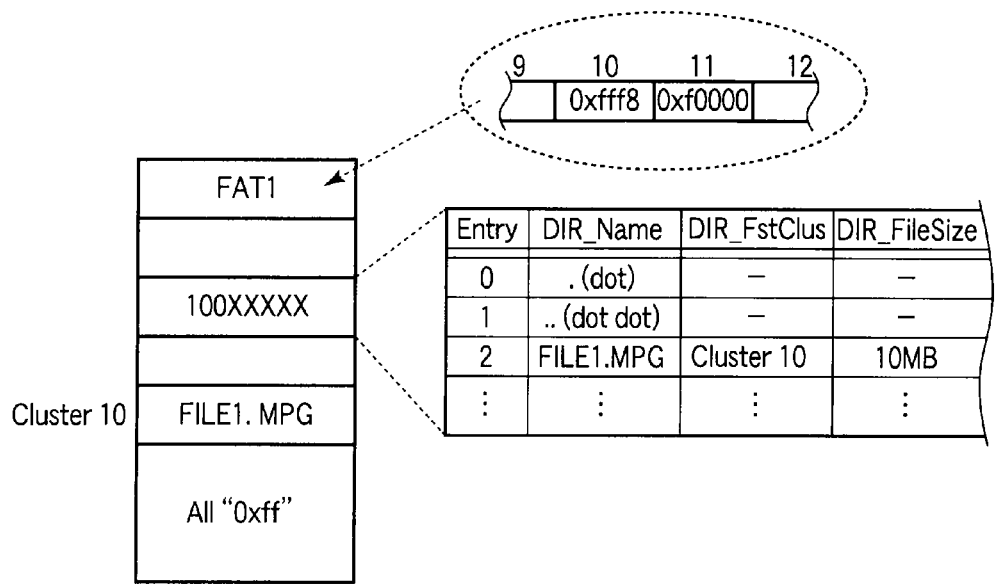
FIGS. 18 and 19 are conceptual diagrams of a memory space according to the third embodiment.

Next, a concrete example of the above operation will be explained. Assume a state is as shown in FIG. 18. FIG. 18 is a memory map of the memory card 1, showing only a part related to this example.

As shown in FIG. 18, in the root directory, subdirectory "100XXXXX" has been created and video file "FILE1.MPG" has been stored under the subdirectory. The video file is in the middle of shooting, the start cluster is cluster 10, and the present file size is 10 MB.

Suppose the video shooting is continued further and cluster 11 is further allocated to video file "FILE1.MPG." Since this process involves overwriting already written data in the FAT and file entries, it is inhibited in the first embodiment.

Figure 19:
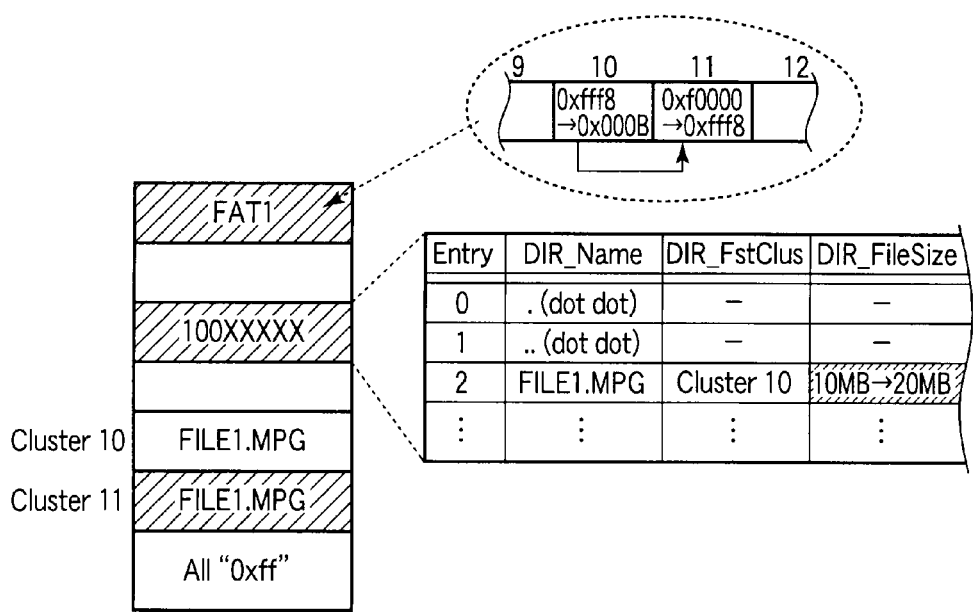

In contrast, in the third embodiment, overwriting the FAT and file entries is permitted as shown in FIG. 19. FIG. 19 is a memory map of the memory card 1. What have been changed from FIG. 18 is indicated by shaded areas in FIG. 19.

As shown in FIG. 19, the memory card 1 secures an unused cluster 11 as an additional cluster for video file "FILE1.MPG." Since the value of cluster 10 in FAT is "0xfff8" (YES in step S41 in FIG. 17) and overwrite data is a valid cluster number ("0x000B") indicating cluster 11 (YES in step S42 in FIG. 17), overwriting FAT is permitted (step S43 in FIG. 17). That is, the value corresponding to cluster number 10 is changed from "0xfff8" to "0x000B." Then, cluster 11 is set as an extended cluster area for video file "FILE1.MPG." Since the rewritten cluster corresponds to a file (NO in step S50), the file size of the file entry is changed (step S51). That is, in the file entry for video file "FILE1.MPG," file size DIR_FileSize is overwritten from 10 MB to a value larger than 10 MB, for example, 20 MB.

<Effect>

Even with the configuration of the third embodiment, write limitation on FAT is relaxed partially to permit the extension of the FAT chain. This makes it possible to write additional data into a created file whose file size has been determined. Accordingly, not only can the effects explained in the first and second embodiments be obtained, but also the user-friendliness of the memory card 1 can be improved further.

[Fourth Embodiment]

Next, a semiconductor device and a memory system according to a fourth embodiment will be explained. The fourth embodiment is such that write limitation on a limited-overwrite permitted directory entry area is determined on a field basis in the first embodiment. Specifically, with the configuration of the fourth embodiment, the following determinations and processes are carried out on a field basis in steps S21 and S22 of FIG. 6 explained in the first embodiment.

(1) DIR_Name (11 bytes)

If the value of all of byte data in a field is other than "0x00," writing to change the value to another value is inhibited and a write protect error is returned.

(2) DIR_Attr (1 byte)

If the value is other than "0x00," writing to change the value to another one is inhibited and a write protect error is returned.

(3) DIR_NTRes (1 byte)

Writing to change to a value other than "0x00" is inhibited and a write protect error is returned.

(4) DIR_CrtTimeTenth, DIR_CrtTime, DIR_CrtDate (5 bytes)

If the value of all of byte data in a field is other than all "0x00," writing to change the value to another value is inhibited and a write protect error is returned.

(5) DIR_LstAccDate (2 bytes)

If the value of all of byte data in a field is other than all "0x00," writing to change the value to another value is inhibited and a write protect error is returned.

(6) DIR_FstClusHI, DIR_FstClusLO (4 bytes)

If the value of all of byte data in a field is other than all "0x00," writing to change the value to another value is inhibited and a write protect error is returned.

(7) DIR_WrtTime, DIR_WrtDate (4 bytes)

If the value of all of byte data in a field is other than all "0x00," writing to change the value to another value is inhibited and a write protect error is returned.

(8) DIR_FileSize (4 bytes)

If the value of all of byte data in a field is other than all "0x00," writing to change the value to another value is inhibited and a write protect error is returned.

<Effect>

With the configuration of the fourth embodiment, write limitation on the limited-overwrite permitted directory entry area is determined on a field basis. This increases the degree of freedom of access to the memory card 1. The fourth embodiment can also be applied to step S23 in FIG. 23. A host unit overwrites the last access date (DIR_LstAccDate) even in reading a file. Accordingly, in this field, overwriting arbitrary data or arbitrary data larger than an already written value (that is, later date) may be permitted. The fourth embodiment may be applied to the second and third embodiments.

As described above, a semiconductor device according to the first to fourth embodiments includes a nonvolatile semiconductor memory device 11 capable of holding data and a memory controller 10 which controls write operation to write data received from a host unit 2 into the semiconductor memory device 11. The memory controller 10 includes a logical address space 40, 41 including a plurality of address areas (a read-only area, a limited-overwrite permitted FAT area, a limited-overwrite permitted directory entry area, and an address-incremental write area in FIG. 3) each having a write limiting condition according to an address and a type of data to be written into the semiconductor memory device 11. As a result, in a specific file format, the addition of a file is allowed and the overwriting of a written file with data is inhibited.

The setting of the address areas is performed by the memory controller 10 according to the address and data at the time of write access from the host unit 2.

In any one of the address areas (an address-incremental write area), only the address-incremental wiring is permitted. In other address areas (a limited-overwrite permitted FAT area and a limited-overwrite permitted directory entry area), only the overwriting of data with the same value and the overwriting of the initial value with another value are permitted.

The address areas comply with the logical area partitions in a logical file format of the semiconductor memory device 11. The file system of the semiconductor memory device 11 is FAT. The memory controller 10 sets different write limiting conditions to the FAT area and directory entry area.

A special host unit may preformat the semiconductor device 1 so as to set the address areas with write limiting conditions in the logical address space of the semiconductor memory device 11.

[Modification]

The first to fourth embodiments can be modified variously. For example, information that informs the host unit 2 of the card type may be added to a read-only card specific data register (CSD register) in the SD card interface 20. In this case, a flag indicating a file-write-once type that prevents a file from being overwritten is added to the CSD register.

In the above embodiments, when data writing has not met the write limiting condition, an error response (or a protect error) has been returned. However, depending on the write condition, a normal end status may be returned instead of an error response. Even in this case, data is not actually written into the NAND flash memory 11. That is, processing may be done as follows: although it appears to the host unit that writing has been performed properly, data is not actually updated.

Figure 20:
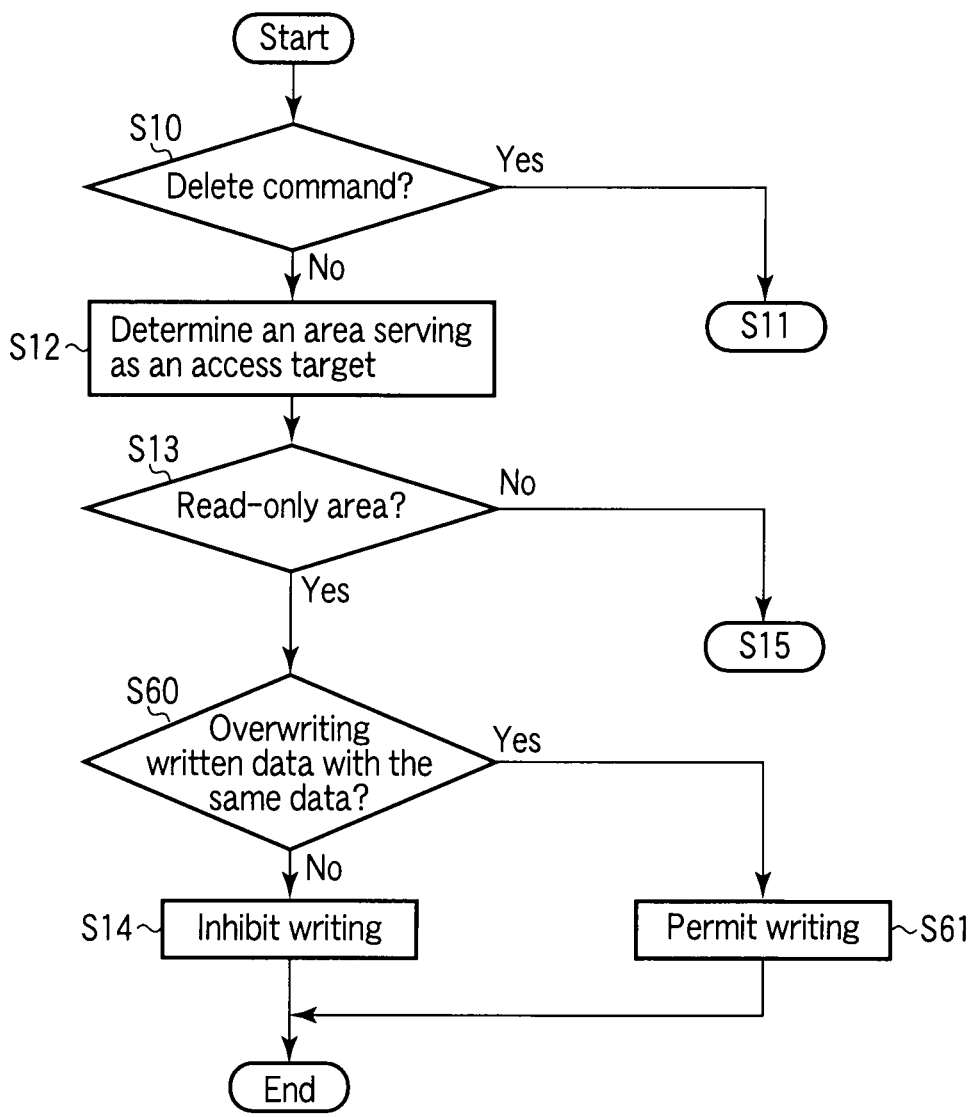
FIG. 20 is a flowchart to explain the operation of a memory card according to a modification of the first to fourth embodiments.

In a read-only area, when already written data is overwritten with the same contents, writing may be permitted. The operation of the memory card 1 in this case is shown in FIG. 20. FIG. 20 corresponds to FIG. 6. As shown in FIG. 20, if the access target is a read-only area (YES in step S13), the memory card 1 determines whether the contents of the write access are overwriting written data with the same data. If the contents are overwriting with the same data (YES in step S60), writing is permitted (step S61). If not, writing is inhibited (step S14).

While in the above embodiments, the embodiments have been applied to FAT16, it may be applied to FAT32 in a similar manner. In addition, the embodiments may be applied to similar file systems with extended FAT.

At the time of preformatting, the root directory may be used as a read-only area. In this case, subdirectories and files are prevented from being created in the root directory.

Restrictions may be put on a file name field (DIR_Name) in a directory entry and a file entry in the limited-overwrite permitted directory entry area. For example, only "10XXXXXX" may be permitted as a subdirectory name and only a file name whose extension is JPG may be permitted. By doing this, the creation of only a subdirectory and a file which have specific names is permitted.

In the above embodiments, preformatting has been performed with a specific subdirectory structure for digital cameras (FIG. 3). However, preformatting may be done with a different subdirectory structure for other uses. For example, up to the root directory may be set by preformatting.

Furthermore, in the above embodiments, an area whose logical addresses are behind those of a created directory structure ("DCIM") at the time of preformatting has been set as an address-incremental write area. However, the area may be set as an arbitrary overwrite permitted area. In this case, in a limited-overwrite permitted directory entry area, a file entry whose file name extension is JPG is created. When the memory controller has detected that a value other than "0x0000" has been written in the start cluster number field, a logical address area behind the start cluster is set as an address-incremental write area. A subdirectory entry area created before the setting of the address-incremental write area is caused to remain as an arbitrary writable area, not as a limited-overwrite permitted directory entry area. This enables a file created before the creation of a JPG file by actually taking a picture to be an overwritable file. Files recorded after the first JPG file become write-once files.

In addition, while in the embodiments, an SD memory card has been used as a semiconductor device, a UHS (ultra high speed)-II card or a memory device embedded to the host unit 2 may be used as a semiconductor device. Of course, a storage medium with a semiconductor device is not limited to the NAND flash memory 11 and may be another semiconductor memory or a storage medium other than a semiconductor memory.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A semiconductor device comprising:
a semiconductor memory device capable of holding data; and
a memory controller which controls a write operation to write data received from a host unit into the semiconductor memory device, and includes an interface to communicate with the host unit, wherein the host unit includes a first processor which executes file system software, and the memory controller includes a second processor that executes software independently of the first processor, wherein the semiconductor device is removable from the host unit, the semiconductor device includes a logical address space including a plurality of address areas each having a write limiting condition according to an address and a type of data to be written into the semiconductor memory device, the memory controller writes a file name and file data associated with the file name by the host unit into the semiconductor memory device, when receiving, from the host unit, alteration requests of the file name and file data for a first file that has been written into the semiconductor memory device, the memory controller rejects the alteration requests, when receiving, from the host unit, write requests for a second file that differs from the first file and has not been written into the semiconductor memory device, the memory controller allows the write requests, and a process for rejecting the alteration requests is executed by the second processor independently of a process in the first processor, wherein a file system of the semiconductor memory device is a File Allocation Table (FAT), the address areas include a directory entry area for storing a file name, a FAT area for storing FAT data, and a data area for storing file data, the controller allows a request for accessing the FAT area from the host unit when the host unit requests overwriting a value with the same value in the FAT area, when the host unit requests overwriting a value indicating an unused area with another value in the FAT area or when the host unit requests overwriting a value indicating an end of a FAT chain with a valid cluster value, otherwise the controller rejects the request for accessing the FAT area from the host unit, and the controller allows a request for accessing the directory entry area from the host unit when the host unit requests overwriting a value with the same value in the directory entry area, or when the host unit requests overwriting a value indicating an unused area with another value in the directory entry area, otherwise the controller rejects the request for accessing the directory entry area from the host unit.

2. The device according to claim 1, wherein the address areas are set by the memory controller according to the address and the type of data at a time of write access from the host unit.

3. The device according to claim 1, wherein only an address-incremental writing is permitted in the data area.

4. The device according to claim 1, wherein the address areas comply with logical area partitions in a logical file format of the semiconductor memory device.

5. The device according to claim 1, wherein
the memory controller sets the write limiting conditions differing from each other to the FAT area and the directory entry area.

6. The device according to claim 1, wherein the memory controller sets a new directory entry area in a cluster corresponding to the overwrite-data when an overwritten area corresponds to a directory entry and, in other cases, permits to overwrite a file size in a corresponding file entry.

7. A memory system comprising:
the semiconductor device recited in claim 1; and
the host unit recited in claim 1 and configured to set the address areas with the write limiting conditions in the logical address space of the semiconductor memory device by preformatting the semiconductor device.

8. The system according to claim 7, wherein the semiconductor device is a card device.

9. The device according to claim 1, wherein the memory controller permits an adding a new file to the semiconductor memory device.

10. The device according to claim 1, wherein the interface is an SD interface.

11. A semiconductor device comprising:
a semiconductor memory device capable of holding data; and
a memory controller which controls a write operation to write data received from a host unit into the semiconductor memory device, and includes an interface to communicate with the host unit, wherein the host unit includes a first processor which executes file system software, and the memory controller includes a second processor that executes software independently of the first processor, wherein the semiconductor device is removable from the host unit, the semiconductor device includes a logical address space including a plurality of address areas each having a write limiting condition according to an address and a type of data to be written into the semiconductor memory device, the memory controller writes a file name and file data associated with the file name by the host unit into the semiconductor memory device, when receiving, from the host unit, alteration requests of the file name and file data for a first file which has been written into the semiconductor memory device, the memory controller rejects the alteration requests, when receiving, from the host unit, write requests for a second file which differs from the first file and has not been written into the semiconductor memory device, the memory controller allows the write requests, and a process for rejecting the alteration requests is executed by the second processor independently of a process in the first processor, wherein a file system of the semiconductor memory device is a File Allocation Table (FAT), the address areas include a directory entry area for storing a file name, a FAT area for storing FAT data, and a data area for storing file data, when the FAT area is requested to be accessed, the memory controller allows only writing a predetermined writing pattern including creating a cluster chain for creating a new directory and a new file, and when the directory entry area is requested to be accessed, the memory controller allows only writing a predetermined writing pattern including creating an entry for creating a new directory and a new file.

12. The device according to claim 11, wherein the address areas are set by the memory controller according to the address and the type of data at a time of write access from the host unit.

13. The device according to claim 11, wherein only an address-incremental writing is permitted in the data area.

14. The device according to claim 11, wherein an overwriting of a value with the same value is permitted in the FAT area and the directory entry area.

15. The device according to claim 11, wherein the address areas comply with logical area partitions in a logical file format of the semiconductor memory device.

16. The device according to claim 11, wherein the memory controller sets the write limiting conditions different from each other to the FAT area and the directory entry area.

17. The device according to claim 11, wherein only an overwriting of data with the same data and an overwriting of a value indicating an unused entry with another value are permitted in the directory entry area.

18. The device according to claim 11, wherein the memory controller sets a new directory entry area in a cluster corresponding to overwrite-data when an overwritten area corresponds to a directory entry and, in other cases, permits to overwrite a file size in a corresponding file entry.

19. A memory system comprising:
the semiconductor device recited in claim 11; and
the host unit recited in claim 11 and configured to set the address areas with the write limiting conditions in the logical address space of the semiconductor memory device by preformatting the semiconductor device.

20. The system according to claim 19, wherein the semiconductor device is a card device.

21. The device according to claim 11, wherein the memory controller permits an adding a new file to the semiconductor memory device.

22. The device according to claim 11, wherein the interface is an SD interface.

23. A method for controlling a semiconductor memory device storing a file name and file data associated with the file name by a host unit, comprising:
receiving, from the host unit, a write command to instruct to write data into the semiconductor memory device;
determining an area to be accessed by the write command;
when the write command is an alternation request of the file name and file data for a first file which has been written into the semiconductor memory device, rejecting the alternation request; and
when the write command is a write request of the file name and file data for a second file which differs from the first file and has not been written into the semiconductor memory device, allowing the write request,
wherein the semiconductor memory device is removable from the host unit,
the semiconductor memory device includes an interface to communicate with the host unit,
the host unit includes a first processor which executes file system software, and the memory controller includes a second processor that executes software independently of the first processor, and
a process for rejecting the alteration requests is executed by the second processor independently of a process in the first processor,
wherein a file system of the semiconductor memory device is a File Allocation Table (FAT),
the semiconductor memory device includes a directory entry area for storing a file name, a FAT area for storing FAT data, and a data area for storing file data,
wherein when the FAT area is requested to be accessed, only writing a predetermined writing pattern including creating a cluster chain for creating a new directory and a new file is allowed, and
when the directory entry area is requested to be accessed, only writing a predetermined writing pattern including creating an entry for creating a new directory and a new file is allowed.

24. The method according to claim 23, further comprising:
receiving a delete command to instruct to delete data in the semiconductor memory device; and
returning an error without deleting the data in response to the delete command.

25. The method according to claim 23, further comprising permitting only address-incremental writing when the area to be accessed is a data area.

26. The method according to claim 23, further comprising:
determining whether data already written in the area to be accessed indicates an end of a FAT chain when the area to be accessed is the FAT area;
determining whether write-data is a valid cluster number when data already written in the area indicates the end of the FAT chain; and
permitting to overwrite the data in the area to be accessed with the write-data when the data already written in the area indicates the end of the FAT chain and the write-data is the valid cluster number.

27. The method according to claim 26, further comprising:
determining whether a cluster associated with the area to be accessed corresponds to a directory when the data already written in the area indicates the end of the FAT chain and the write-data is the valid cluster number;
creating a new directory entry area when the cluster corresponds to the directory; and
changing a file size of a corresponding file entry in a directory entry area when the cluster does not correspond to the directory.

28. The method according to claim 23, further comprising returning an error without writing the data when the area to be accessed is the FAT area or the directory entry area and contents of the write command are other than the overwriting of data with the same value and the overwriting of an initial value with another value.

29. The method according to claim 23, further comprising returning a normal end status without writing the data when the area to be accessed is the FAT area or the directory entry area and contents of the write command are other than the overwriting of data with the same value and the overwriting of an initial value with another value.

30. The method according to claim 23, wherein when the write command is the alternation request, the memory device permits only an overwriting of data with the same value and an overwriting of an initial value with another value when the area to be accessed is the FAT area or the directory entry area.

31. The method according to claim 23, further comprising:
permitting to add a new file to the semiconductor memory device.

* * * * *